(12) United States Patent
Ma et al.

(10) Patent No.: US 11,891,261 B2
(45) Date of Patent: Feb. 6, 2024

(54) DEVICE AND METHOD FOR DETECTING FLATNESS OF SHEET MATERIAL

(71) Applicant: Taiyuan University of Science and Technology, Taiyuan (CN)

(72) Inventors: Lifeng Ma, Taiyuan (CN); Ziliang Li, Taiyuan (CN); Qingxue Huang, Taiyuan (CN); Tao Wang, Taiyuan (CN); Dahai Jing, Taiyuan (CN); Rongjun Wang, Taiyuan (CN); Lianyun Jiang, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 524 days.

(21) Appl. No.: 17/138,968

(22) Filed: Dec. 31, 2020

(65) Prior Publication Data
US 2021/0198075 A1 Jul. 1, 2021

(30) Foreign Application Priority Data
Dec. 31, 2019 (CN) .......................... 201911408784.0

(51) Int. Cl.
G06T 7/207 (2017.01)
B65H 43/04 (2006.01)

(52) U.S. Cl.
CPC ............. *B65H 43/04* (2013.01); *G06T 7/207* (2017.01); *B65H 2515/84* (2013.01); *B65H 2553/42* (2013.01); *B65H 2557/51* (2013.01); *B65H 2601/2532* (2013.01)

(58) Field of Classification Search
CPC ... G01B 11/2513; G01B 11/306; G01B 11/30; G01N 2223/642; B65H 2553/42
See application file for complete search history.

(56) References Cited

U.S. PATENT DOCUMENTS

| 9,003,846 B2* | 4/2015 | Isei ...................... G01B 11/303 72/11.2 |
| 9,383,704 B2* | 7/2016 | Namiki .............. G03G 15/6594 |
| 2013/0098127 A1* | 4/2013 | Isei ........................... B21B 1/22 72/17.3 |

FOREIGN PATENT DOCUMENTS

| CN | 103486995 A | * | 1/2014 | |
| CN | 109186491 A | * | 1/2019 | |
| CN | 210564905 U | * | 5/2020 | ............. F03D 13/30 |

* cited by examiner

*Primary Examiner* — Tarifur R Chowdhury
*Assistant Examiner* — Kemaya Nguyen
(74) *Attorney, Agent, or Firm* — MATTHIAS SCHOLL P.C.; Matthias Scholl

(57) ABSTRACT

A device for detecting the flatness of a sheet material includes a conveyor, a gantry, a beam, an industrial camera unit, a speed measurement unit, a vibration measurement unit, a multi-line laser, a cable carrier, an industrial controller, and a control cabinet. The conveyor is disposed beneath the gantry and includes a plurality of pinch roll assemblies for feeding a sheet material. The beam is disposed on the gantry and includes a first side and a second side. The industrial camera unit is disposed on the first side of the beam and includes at least two industrial cameras. The speed measurement unit is disposed between the at least two industrial cameras. The vibration measurement unit is disposed on the second side of the beam and includes at least two distance measurement devices. The multi-line laser is disposed between the at least two distance measurement devices.

5 Claims, 3 Drawing Sheets

DEVICE AND METHOD FOR DETECTING FLATNESS OF SHEET MATERIAL

CROSS-REFERENCE TO RELATED APPLICATIONS

Pursuant to 35 U.S.C. § 119 and the Paris Convention Treaty, this application claims foreign priority to Chinese Patent Application No. 201911408784.0 filed Dec. 31, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a device and method for detecting the flatness of a sheet material.

The steel plates require straightening or flattening after production. When conventional straightening machines and flatting machines are used to process a steel plate, the flatness of the steel plate is determined by naked eyes of the operators. The judgment is inefficient and subjective.

SUMMARY

The disclosure provides a device for detecting the flatness of a sheet material comprising a conveyor, a gantry, a beam, an industrial camera unit, a speed measurement unit, a vibration measurement unit, a multi-line laser, a cable carrier, an industrial controller, and a control cabinet. The conveyor is disposed beneath the gantry and comprises a plurality of pinch roll assemblies for feeding a sheet material. The beam is disposed on the gantry and comprises a first side and a second side. The industrial camera unit is disposed on the first side of the beam and comprises at least two industrial cameras. The speed measurement unit is disposed between the at least two industrial cameras. The vibration measurement unit is disposed on the second side of the beam and comprises at least two distance measurement devices. The multi-line laser is disposed between the at least two distance measurement devices. The industrial controller is connected via the cable carrier to the industrial camera unit, the speed measurement unit, and the vibration measurement unit. The industrial controller is connected through a communication cable to the industrial controller.

In a class of this embodiment, each of the industrial cameras, the speed measurement unit, the distance measurement devices, and the multi-line laser is equipped with a dust-proof thermal insulating cover.

The disclosure also provides a method for detecting the flatness of a sheet material, the method comprising:

1) calibrating the industrial cameras to estimate intrinsic parameters, extrinsic parameters, and lens distortion parameters;
2) calibrating a structured-light measurement system formed by each industrial camera and the multi-line laser, and determining an equation of a laser plane in a coordinate system defined by each of the industrial cameras;
3) starting the speed measurement unit to detect and measure a position and speed of a sheet material;
4) when the sheet material starts moving, starting the speed measurement unit, the distance measurement devices, and the multi-line laser;
5) determining a sampling frequency of each industrial camera according to the speed of the sheet material; and collecting images taken with each industrial camera;
6) analyzing laser lines in each image which are generated by the multi-line laser;
7) determining a fast variable value acquired by the vibration measurement unit, calculating a vibrational amplitude of each point on a centerline of each laser line; and compensating for a first point cloud data with the vibrational amplitude, wherein the first point cloud data is a collection of points scanned by the centerline of the laser lines;
8) measuring the same position of the sheet material with all of the laser lines; obtaining a maximum distance from each industrial camera to each point on the sheet material; regenerating a second point cloud data and storing the second point cloud data in a table;
9) constructing a sheet material model from the second point cloud data for each camera, thereby reconstructing a partial 3D flatness of the sheet material;
10) numbering the industrial cameras from 1 to n from a leftmost camera to a rightmost camera; numbering the sheet material model created by each industrial camera with a serial number corresponding to the industrial camera; selecting the first sheet material model as a reference, performing a data fusion for an overlapped area between the first sheet material model and the second sheet material model; continuing the data fusion in the same manner until no sheet material model is left, thereby reconstructing a complete 3D flatness of the sheet material; and
11) calculating a deflection and a radius of curvature according to the complete 3D flatness data; transferring the deflection and the radius of curvature to the industrial controller to provide a basis for correction of the flatness of the sheet material.

In a class of this embodiment, in 6), analyzing the laser lines in each image comprises: pre-processing of the images taken with each industrial camera; highlighting the laser lines; calculating a binarization threshold for each pixel in the images; binarizing the images; refining the binary images; extracting pixel coordinates of the refined images; estimating calibration parameters of the refined images; calculating point cloud data of each point according to the pixel coordinate and calibration parameters, and storing the point cloud data for each laser line in corresponding space for calculation.

In a class of this embodiment, in 7), calculating the vibrational amplitude of each point on the centerline of the laser line comprises: dividing an effective field of view of the centerline of the laser line into five segments by using six points, where the five segment between six points have the same length of L; leaving a length of L1 on both sides of a first point and a sixth point, where L1<0.2L; monitoring distance information of the six points in real time; supposing the vibrational amplitude of the six points as σ1, σ2, σ3, σ4, σ5, and σ6, respectively, when there is a sudden change in the distance between at least two adjacent points, a fast variable signal appears, and the sheet material is considered vibrating; calculating a line equation of two adjacent points, and estimating the vibrational amplitude of all points between the two adjacent points according to the linear equation.

In a class of this embodiment, estimating the vibrational amplitude of all points between the two adjacent points comprises: taking two points $\sigma_n$ and $\sigma_m$, letting $n \in \{n | 1 \leq n \leq 5, n \in Z\}$, $m=n+1$, and $\sigma_n$ has $((n-1)L, \sigma_n)$ as its abscissa, such that coordinates of the two points are $\sigma_n = ((n-1)L, \sigma_n)$ and $\sigma_m = (nL, \sigma_m)$; calculating a coordinate (x, y) of any point between the point $\sigma_n$ to the point $\sigma_m$ using a formula $y = \sigma_m + (x-nL)(\sigma_m - \sigma_n)/L$, where $x \in ((n-1)L, nL)$; when $n=1$, $x \in (0,L)$, calculating the length of L1 on one side of the first point using the formula, where $n=1$ and $x \in (-L1, 0)$; when $n=5$, $x \in (4L, 5L)$, calculating the length of L1 on one side of the sixth point using the formula, where $n=5$ and $x \in (5L, 5L+L1)$; continuing calculating other segments using the formula $y = \sigma_m + (x-nL)(\sigma_m - \sigma_n)/L$, thereby completing the evaluation of vibrational amplitude of each laser line.

The following advantages are associated with the device of the disclosure:

1. The device of the disclosure is an on-line machine vision system for detecting the defects in a moving sheet material, which captures the size information of sheet materials in three dimensions and transfers the size information to the industrial controller. The device forms a closed-loop control in the straightening and leveling process, improves the automation and intelligence level of the production line, and improves the efficiency of the correction and forming of the sheet material.

2. The device of the disclosure employs the multi-line laser used in combination with the multiple industrial cameras, which reduces the error caused by vibration to the 3D reconstruction of the flatness of the sheet materials and has a simple structure and convenient installation, thereby laying a foundation for automation and intelligentization of the plate finishing line.

Figure 1:
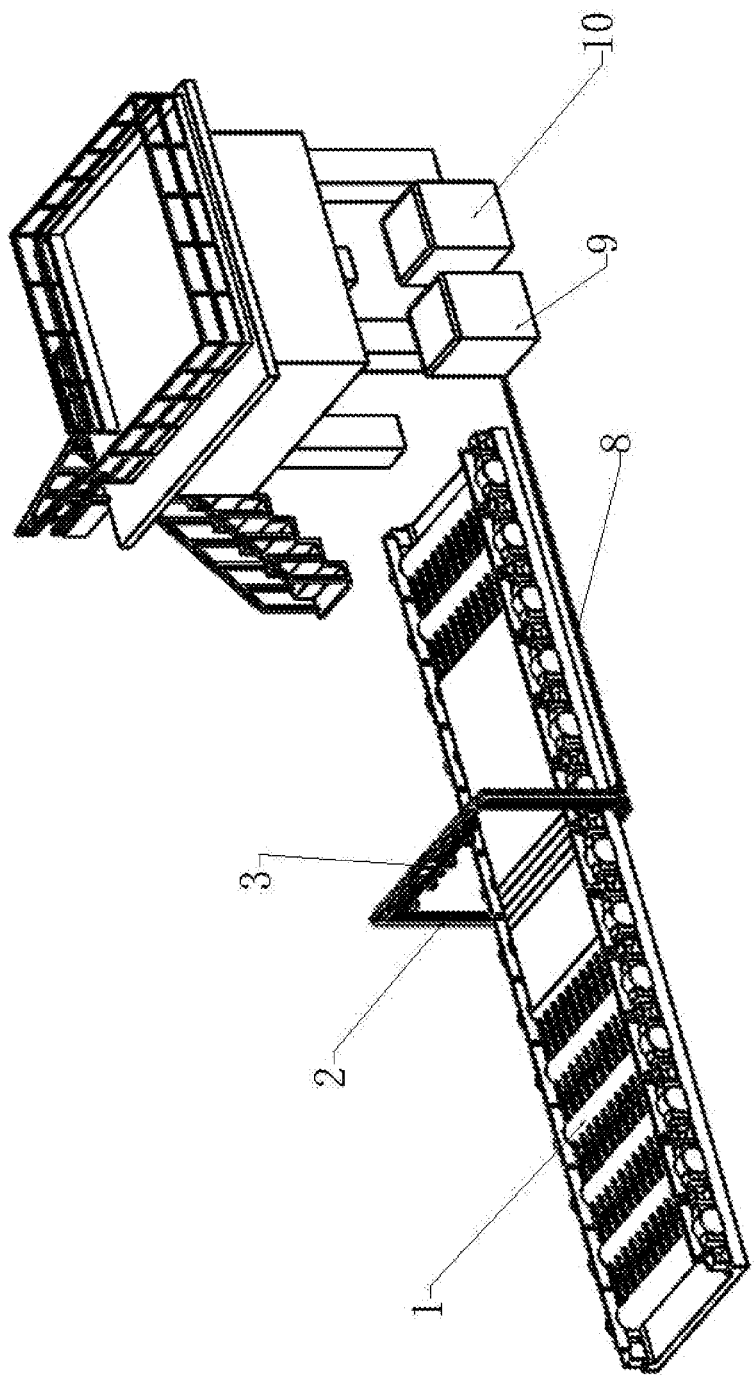
FIG. 1 is a schematic diagram of a device for detecting the flatness of a sheet material according to the embodiment of the disclosure.

In the drawings, the following reference numbers are used: 1. Conveyor; 2. Gantry; 3. Beam; 4. Industrial camera unit; 5. Speed measurement unit; 6. Vibration measurement unit; 7. Multi-line laser; 8. Cable carrier; 9. Industrial controller; and 10. Control cabinet.

DETAILED DESCRIPTION

To further illustrate the disclosure, embodiments detailing a device and method for detecting the flatness of a sheet material are described below. It should be noted that the following embodiments are intended to describe and not to limit the disclosure.

Figure 2:
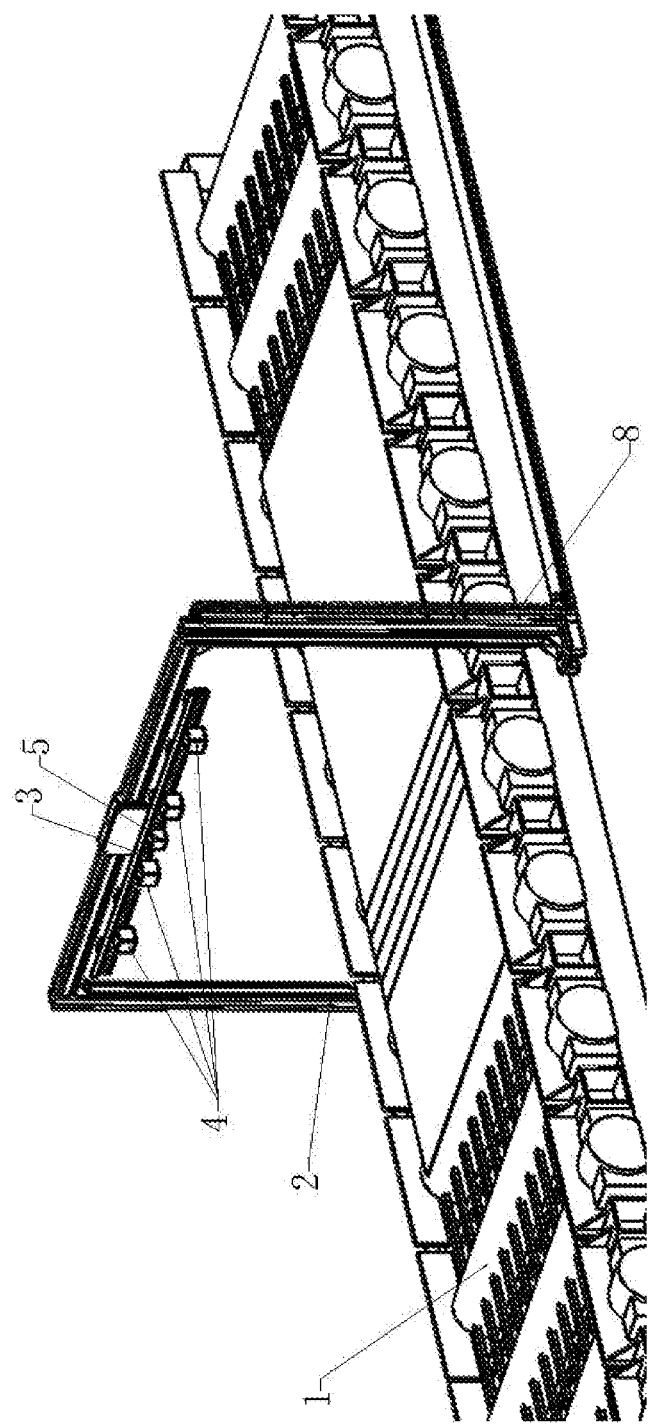
FIG. 2 is a schematic diagram of a beam of a device for detecting the flatness of a sheet material according to one embodiment of the disclosure.
Figure 3:
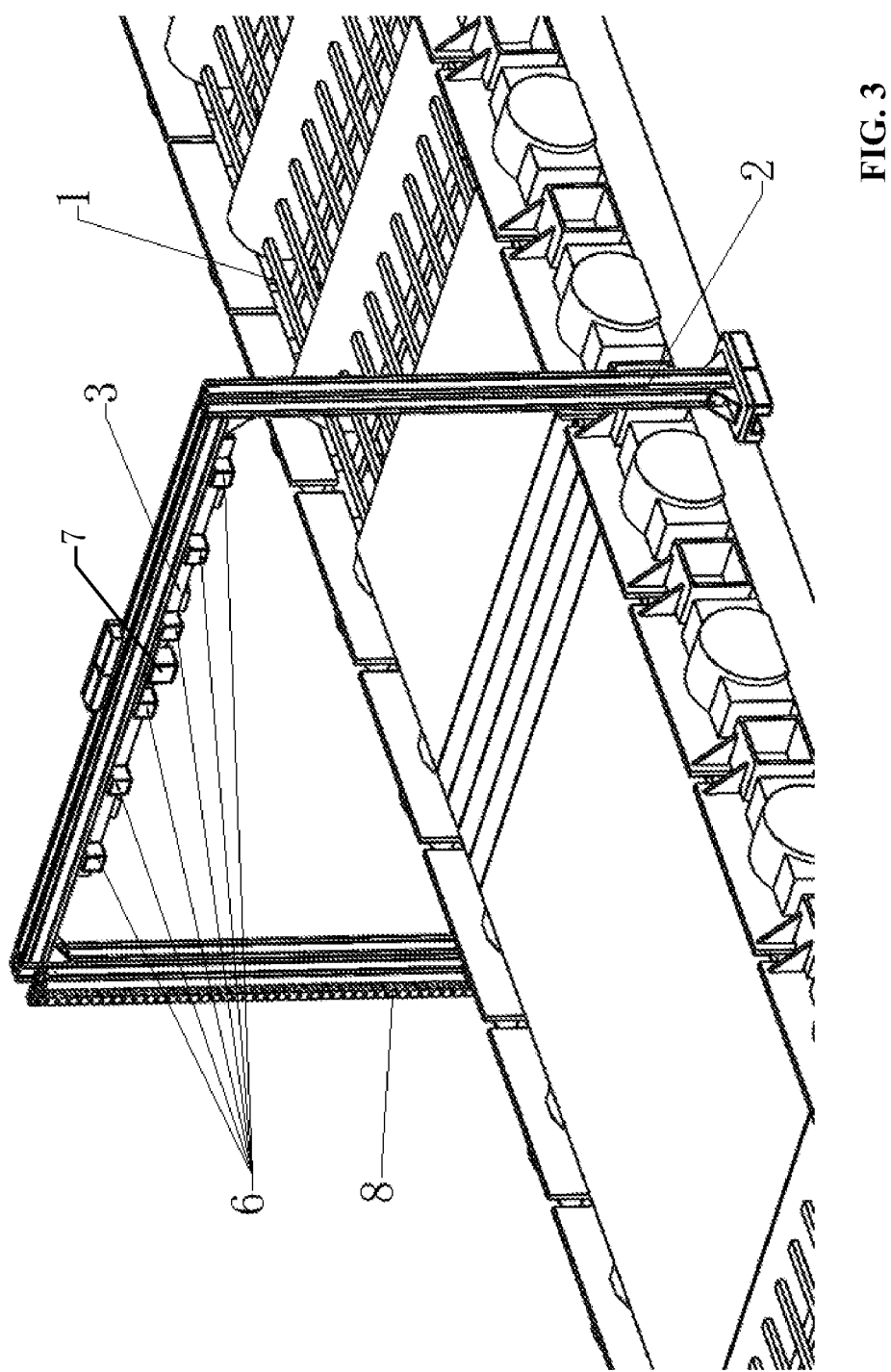
FIG. 3 is a schematic diagram of a beam of a device for detecting the flatness of a sheet material according to another embodiment of the disclosure.

Referring to FIGS. 1, 2, and 3, a device for detecting the flatness of a sheet material comprises a conveyor 1, a gantry 2, a beam 3, an industrial camera unit 4, a speed measurement unit 5, a vibration measurement unit 6, a multi-line laser 7, a cable carrier 8, an industrial controller 9, and a control cabinet 10. The conveyor 1 is disposed beneath the gantry 2 and comprises a plurality of pinch roll assemblies for feeding a sheet material. The beam 3 is disposed on the gantry 2 and comprises a first side and a second side. The industrial camera unit 4 is disposed on the first side of the beam 3 and comprises at least two industrial cameras. The speed measurement unit 5 is disposed between the at least two industrial cameras. The vibration measurement unit 6 is disposed on the second side of the beam 3 and comprises at least two distance measurement devices. The multi-line laser 7 is disposed between the at least two distance measurement devices. The industrial controller 9 is connected via the cable carrier 8 to the industrial camera unit 4, the speed measurement unit 5, and the vibration measurement unit 6. The industrial controller 10 is connected through a communication cable to the industrial controller 9.

Further, each of the industrial cameras, the speed measurement unit 5, the distance measurement devices, and the multi-line laser 7 is covered with a dust-proof thermal insulating cover so as to minimize dust accumulation and thermal radiation during a leveling process.

A method for detecting the flatness of a sheet material using the device comprises:

1) calibrating the industrial cameras to estimate intrinsic parameters, extrinsic parameters, and lens distortion parameters;

2) calibrating a structured-light measurement system formed by each industrial camera and the multi-line laser, and determining an equation of a laser plane in a coordinate system defined by each of the industrial cameras;

3) starting the speed measurement unit to detect and measure a position and speed of a sheet material;

4) when the sheet material starts moving, starting the speed measurement unit, the distance measurement devices, and the multi-line laser;

5) determining a sampling frequency of each industrial camera according to the speed of the sheet material; and collecting images taken with each industrial camera;

6) analyzing laser lines in each image which are generated by the multi-line laser;

7) determining a fast variable value acquired by the vibration measurement unit, calculating a vibrational amplitude of each point on a centerline of each laser line; and compensating for a first point cloud data with the vibrational amplitude, wherein the first point cloud data is a collection of points scanned by the centerline of the laser lines;

8) measuring the same position of the sheet material with all of the laser lines; obtaining a maximum distance from each industrial camera to each point on the sheet material; regenerating a second point cloud data and storing the second point cloud data in a table;

9) constructing a sheet material model from the second point cloud data for each camera, thereby reconstructing a partial 3D flatness of the sheet material;

10) numbering the industrial cameras from 1 to n from a leftmost camera to a rightmost camera; numbering the sheet material model created by each industrial camera with a serial number corresponding to the industrial camera; selecting the first sheet material model as a reference, performing a data fusion for an overlapped area between the first sheet material model and the second sheet material model; continuing the data fusion in the same manner until no sheet material model is left, thereby reconstructing a complete 3D flatness of the sheet material; and 11) calculating a deflection and a radius of curvature according to the complete 3D flatness data; transferring the deflection and the radius of curvature to the industrial controller to provide a basis for correction of the flatness of the sheet material.

Specifically, in 6), analyzing the laser lines in each image comprises: pre-processing of the images taken with each industrial camera; highlighting the laser lines; calculating a binarization threshold for each pixel in the images; binarizing the images; refining the binary images; extracting pixel coordinates of the refined images; estimating calibration parameters of the refined images; calculating point cloud data of each point according to the pixel coordinate and calibration parameters, and storing the point cloud data for each laser line in corresponding space for calculation.

Specifically, in 7), calculating the vibrational amplitude of each point on the centerline of the laser line comprises: dividing an effective field of view of the centerline of the laser line into five segments by using six points, where the five segment between six points have the same length of L; leaving a length of L1 on both sides of a first point and a sixth point, where L1<0.2L; monitoring distance information of the six points in real time; supposing the vibrational amplitude of the six points as σ1, σ2, σ3, σ4, σ5, and σ6, respectively, when there is a sudden change in the distance between at least two adjacent points, a fast variable signal appears, and the sheet material is considered vibrating; calculating a line equation of two adjacent points, and estimating the vibrational amplitude of all points between the two adjacent points according to the linear equation.

Further, estimating the vibrational amplitude of all points between the two adjacent points comprises: taking two points $\sigma_n$ and $\sigma_m$, letting $n \in \{n|1 \leq n \leq 5, n \in Z\}$, $m=n+1$, and $\sigma_n$ has $((n-1)L, \sigma_n)$ as its abscissa, such that coordinates of the two points are $\sigma_n=((n-1)L, \sigma_n)$ and $\sigma_m=(nL, \sigma_m)$; calculating a coordinate (x, y) of any point between the point $\sigma_n$ to the point $\sigma_m$ using a formula $y=\sigma_m+(x-nL)(\sigma_m-\sigma_n)/L$, where $x \in ((n-1)L, nL)$; when $n=1$, $x \in (0,L)$, calculating the length of L1 on one side of the first point using the formula, where $n=1$ and $x \in (-L1,0)$; when $n=5$, $x \in (4L,5L)$, calculating the length of L1 on one side of the sixth point using the formula, where $n=5$ and $x \in (5L,5L+L1)$; continuing calculating other segments using the formula $y=\sigma_m+(x-nL)(\sigma_m-\sigma_n)/L$, thereby completing the evaluation of vibrational amplitude of each laser line.

It will be obvious to those skilled in the art that changes and modifications may be made, and therefore, the aim in the appended claims is to cover all such changes and modifications.

What is claimed is:

1. A method for detecting a flatness of a sheet material using a device, wherein:
   the device comprise: a conveyor; a gantry; a beam; a camera unit a speed measurement unit; a vibration measurement unit; a multi-line laser for emitting laser beams; a cable carrier; a controller; and a control cabinet wherein, the conveyor is disposed beneath the gantry and comprises a plurality of pinch roll assemblies for feeding a sheet material; the beam is disposed on the gantry and comprises a first side and a second side; the camera unit is disposed on the first side of the beam and comprises at least two cameras; the speed measurement unit is disposed between the at least two cameras; the vibration measurement unit is disposed on the second side of the beam and comprises at least two distance measurement devices; the multi-line laser is disposed between the at least two distance measurement devices; the controller is connected via the cable carrier to the camera unit, the speed measurement unit, and the vibration measurement unit; and the controller is connected through a communication cable to the controller; and the method comprises:
   1. calibrating the cameras to estimate intrinsic parameters, extrinsic parameters, and lens distortion parameters;
   2. calibrating a structured-light measurement system formed by each camera and the multi-line laser, and determining an equation of a laser plane in a coordinate system defined by each of the cameras;
   3. starting the speed measurement unit to detect and measure a position and speed of a sheet material;
   4. when the sheet material starts moving, starting the speed measurement unit, the distance measurement devices, and the multi-line laser;
   5. determining a sampling frequency of each camera according to the speed of the sheet material; and collecting images taken with each camera;
   6. analyzing laser beams in each image;
   7. determining a fast variable value acquired by the vibration measurement unit, calculating a vibrational amplitude of each point on a centerline of each laser beam; and compensating for a first point cloud data with the vibrational amplitude, wherein the first point cloud data is a collection of points scanned by the centerline of the laser beams;
   8. measuring the same position of the sheet material with all of the laser beams; obtaining a maximum distance from each camera to each point on the sheet material; regenerating a second point cloud data and storing the second point cloud data in a table;
   9. constructing a sheet material model from the second point cloud data for each camera, thereby reconstructing a partial 3D flatness of the sheet material;
   10. numbering the cameras from 1 to n from a leftmost camera to a rightmost camera; numbering the sheet material model created by each camera with a serial number corresponding to the camera; selecting a first sheet material model as a reference, performing a data fusion for an overlapped area between the first sheet material model and a second sheet material model; continuing the data fusion in the same manner until no sheet material model is left, thereby reconstructing a complete 3D flatness of the sheet material; and
   11. calculating a deflection and a radius of curvature according to the complete 3D flatness data; transferring the deflection and the radius of curvature to the controller to provide a basis for correction of the flatness of the sheet material.

2. The device of claim 1, wherein each of the cameras, the speed measurement unit, the distance measurement devices, and the multi-line laser is equipped with a dust-proof thermal insulating cover.

3. The method of claim 1, wherein in 6), analyzing laser beams in each image comprises: pre-processing of the images taken with each camera; highlighting the laser beams; calculating a binarization threshold for each pixel in the images; binarizing the images; refining the binary images; extracting pixel coordinates of the refined images; estimating calibration parameters of the refined images; calculating point cloud data of each point according to the pixel coordinate and calibration parameters, and storing the point cloud data for each laser beam in corresponding space for calculation.

4. The method of claim 1, wherein in 7), calculating the vibrational amplitude of each point on the centerline of the each laser beam comprises: dividing an effective field of view of the centerline of the each laser beam into five segments by using six points, where the five segment between six points have the same length of L; leaving a length of L1 on both sides of a first point and a sixth point, where L1<0.2L; monitoring distance information of the six points in real time; supposing the vibrational amplitude of the six points as σ1, σ2, σ3, σ4, σ5, and σ6, respectively, when there is a sudden change in the distance between at least two adjacent points, a fast variable signal appears, and the sheet material is considered vibrating; calculating a line equation of two adjacent points, and estimating the vibrational amplitude of all points between the two adjacent points according to the linear equation.

5. The method of claim 4, wherein estimating the vibrational amplitude of all points between the two adjacent points comprises: taking two points $\sigma_n$ and $\sigma_m$, letting $n \in \{n | 1 \leq n \leq 5, n \in Z\}$, $m=n+1$, and $\sigma_n$ has $((n-1)L, \sigma_n)$ as its abscissa, such that coordinates of the two points are $\sigma_n = ((n-1)L, \sigma_n)$ and $\sigma_m = (nL, \sigma_m)$; calculating a coordinate (x, y) of any point between the point $\sigma_n$ to the point $\sigma_m$ using a formula $y = \sigma_m + (x-nL)(\sigma_m - \sigma_n)/L$, where $x \in ((n-1)L, nL)$; when $n=1$, $x \in (0, L)$, calculating the length of L1 on one side of the first point using the formula, where $n=1$ and $x \in (-L1, 0)$; when $n=5$, $x \in (4L, 5L)$, calculating the length of L1 on one side of the sixth point using the formula, where $n=5$ and $x \in (5L, 5L+L1)$; continuing calculating other segments using the formula $y = \sigma_m + (x-nL)(\sigma_m - \sigma_n)/L$, thereby completing the evaluation of vibrational amplitude of each laser beam.

* * * * *